UNITED STATES PATENT OFFICE.

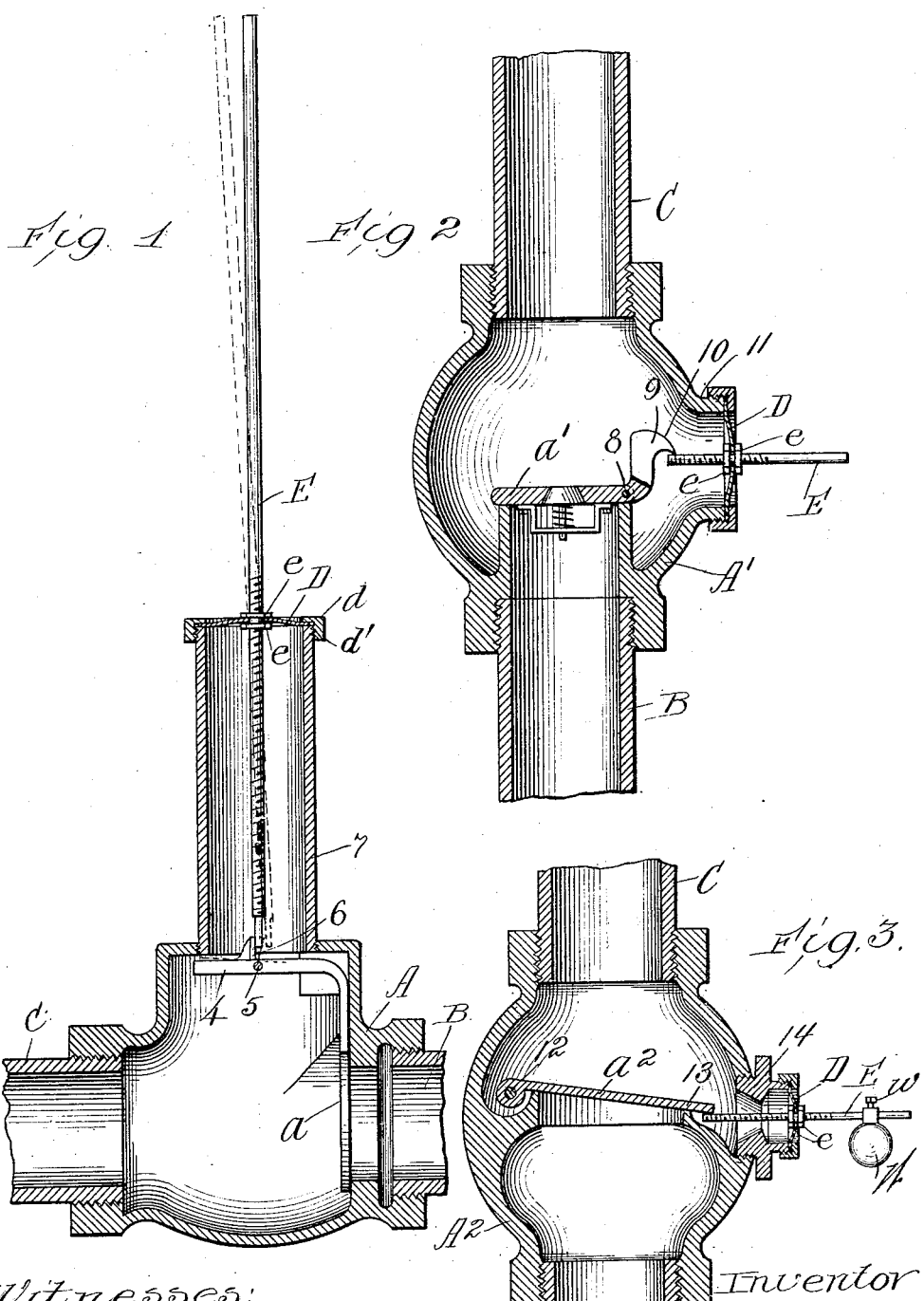

JAMES G. NOLEN, OF CHICAGO, ILLINOIS, ASSIGNOR, BY MESNE ASSIGNMENTS, TO AUTOMATIC FIRE PROTECTION COMPANY, A CORPORATION OF MAINE.

VALVE.

No. 863,553.　　　　　　　Specification of Letters Patent.　　　　　Patented Aug. 13, 1907.

Application filed October 21, 1904. Serial No. 229,366.

*To all whom it may concern:*

Be it known that I, JAMES G. NOLEN, of Chicago, in the county of Cook and State of Illinois, have invented certain new and useful Improvements in Valves; and I hereby declare that the following is a full, clear, and exact description thereof, reference being had to the accompanying drawings, which form part of this specification.

My invention relates to improvements in valves, and has for its primary object to provide a device for transmitting motion from the movable member of an inclosed valve to an extraneous part or parts, which means will be simple, durable, reliable and liquid tight.

In the drawings, wherein I have illustrated the embodiment of my invention in several constructions differing in details, Figure 1 is a central vertical section of a valve construction embodying my invention. Fig. 2 is a similar view of a modified embodiment of my invention, and, Fig. 3 is a similar view of a still different embodiment of my invention.

Throughout the drawings like numerals of reference refer always to like parts.

Referring now to the embodiment of my invention illustrated in Fig. 1, A indicates generally a valve casing having connection with two pipe sections B and C. Within the valve casing A is the movable element $a$ of a flap valve having an arm 4 pivoted as at 5 and provided adjacent its pivot with an upwardly projecting nose 6. 7 indicates a hollow, preferably tubular structure threaded into a suitable opening in the valve casing A and having open communication therewith. At its top the tube 7 is closed by a flexible diaphragm D, preferably metal, which forms a yielding part of the complete valve casing. The diaphragm D is secured to the tube 7 in any suitable way to make water tight connection therewith, as for instance by the annular cap $d$ the flange $d'$ whereof is screw threaded for engagement with a screw threaded end of the tube 7.

An operating member or stem E adapted to be instrumental in effecting connection between the movable valve member A and exterior devices passing through the diaphragm D, preferably centrally thereof, and at right angles to the general plane of the diaphragm, and makes connection therewith. To this end the lower portion of the stem E is preferably screw threaded and passes through an aperture of suitable size in the center of the diaphragm D, the stem being secured-in position relative to said diaphragm and effecting a firm and water-tight joint therewith, suitable check nuts $e—e$ being preferably provided on opposite sides of the diaphragm and preferably locked in position relative to the diaphragm and the stem by solder. The lower or inner extremity of the stem E is arranged in proximity to and preferably in contact with the stud 6 upon the arm of the valve $a$, and is arranged in such a way that the movement of the valve-member $a$ and the concomitant movement of the stud 6 operates to move the lower extremity of stem E from the normal position wherein it is maintained by its connection with the diaphragm to dotted line position. Such movement of the lower extremity of the stem causes the stem to practically pivot upon its connection with the diaphragm D, the outer end of the stem moving out of alinement with the aperture in the diaphragm on the side thereof opposite that toward which the inner extremity of the stem moves. Such movement of the stem causes the diaphragm to buckle slightly, the portion of the diaphragm on one side of a line drawn at right angles to the direction of movement of the stem bending outward and the portion of the diaphragm upon the opposite side of said line bending inward. Thus the area of the chamber closed by said diaphragm remains practically unchanged under all conditions, the outward bending on the one side of the diaphragm compensating for the inward bending of the other side thereof when the diaphragm buckles under the movement of the stem E. As a matter of fact the movement of the stem at what I will term its pivotal point of connection with the diaphragm is so slight as to be scarcely, if at all, perceptible to the eye, but yet the diaphragm exerts a very appreciable effect to spring the stem back to its normal position.

It will be apparent that the outer end of the stem may be associated in any suitable way with devices to be operated, such, for instance, as the call mechanism of a signal circuit, electrical contact parts, or like devices, not deemed necessary here to illustrate.

Referring now to the construction which in Fig. 2, the check valve $a'$ within the valve casing A' is pivoted as at E and is provided with a hook-shaped nose 9 in rear of the pivot, said nose 9 preferably having its outer surface 10 curved on an arc struck with the pivot as a center.

The stem E is secured by a cap $d$ or other suitable connection upon a hollow boss 11, made at any suitable point upon the valve casing A', and the stem E is pivotally secured thereto in the manner heretofore described, the position of the parts being such that the stem E, when the valve is in closed position, underlies the forwardly projecting end of the nose 9. It will be apparent now that the parts described form a limited movement connection between the movable valve element $a'$ and the stem E, the nose 9, during the first part of the movement of valve element $a'$ toward open position moving the ewith the inner extremity of the stem E. When, however, the point of the nose 9 passes the end of said stem, the curved surface 10 of the valve member passes below the end of the stem E without moving said stem further, but without permitting the latter to move back to normal position. In this way I provide for an extended movement of the valve member $a'$ with a concomitant movement of the stem E, to only a limited extent, the remaining movement of said valve member having no effect on stem E.

It will be apparent that in the form of mechanism shown in Fig. 2, as well as that shown in Fig. 1, the spring tendency of the diaphragm D operates to resist movement of the valve member $a$ or $a'$ and to restore said valve member to closed position upon the release or relief of the opening pressure.

In Fig. 3 I have shown a form of device wherein the operation of the stem E and its diaphragm act to assist the movement of the movable valve member to open position and to oppose its restoration to closed position. In said valve the check valve member $a^2$ within the valve casing $A^2$ is pivoted in the usual manner as at 12, the opposite extremity 13 of the valve projecting beyond the seat thereof. The diaphragm D is secured preferably by means such as the cap heretofore described, in a suitable bushing 14 screwed or otherwise secured in the valve casing to provide open communication between the valve casing and the diaphragm. The stem E projecting through the diaphragm and secured thereto preferably in the manner heretofore described, is limited as to its range of movement by the walls of bushing 14, and at its innermost end underlies the projecting extremity 13 of the valve member $a^2$. Means independent of the valve member $a^2$ are provided tending to move said stem E in such direction that its inner extremity will follow the movement of the extremity 13 of the valve member $a^2$ during the opening of the valve, such means being herein indicated as a weight W adjustably secured upon the outer end of the stem E as by a set nut $w$.

The arrangement of parts should be such that the weight of the valve member $a^2$ overbalances the weight W so that normally the valve member $a^2$ remains closed and the stem E is thereby held in full line position as shown in Fig. 3. When now the valve member $a^2$ is moved to open position its weight is removed from the inner extremity of the stem E and the weight W, or other means employed for the purpose, serves to depress the outer end of stem E and to maintain the said stem in such position until the return movement of the valve member $a^2$ restores the stem to its original or full line position.

While I have herein described in some detail several specific embodiments of my invention, which I believe to be novel and respectively advantageous for various purposes, I do not desire to be understood as limiting the application of my invention to such forms as those herein shown further than as specified in the claims, as it will be apparent that my invention might be embodied in diverse forms and numerous changes in the mechanical construction might be made without departing from the spirit and scope of my invention.

Having thus described my invention, what I claim and desire to secure by Letters Patent, of the United States, is:—

1. The combination with a valve casing having a relatively large aperture therein, and a movable valve member within the casing, of a resilient metal diaphragm for tightly closing said aperture in the casing, and a stem of relatively small diameter extending through said diaphragm from the exterior of the casing to the interior thereof, wholly supported by the diaphragm, whereby its movements may buckle the diaphragm in either direction, the inner end of the stem being operatively associated with the valve for movement consistently therewith.

2. In combination with a valve casing having an aperture therein, and a valve within the casing, of a resilient diaphragm supported at its edges only and centrally free in the aperture for buckling movement on either side of its normal plane, and a stem, extending into and without the casing, making tight connection with the diaphragm at its center, the inner end of said stem being associated with the valve for movement therewith as the valve opens, to put the diaphragm under tension tending to return the stem to normal position.

3. In a device of the character described, a valve casing having an opening therein, a metal diaphragm covering said opening, secured only at its edges, and centrally free of support and resistance against buckling, a stem passing centrally through the diaphragm and connected therewith to pivot therein, the inner end of the stem being associated with the valve and arranged to have its movement in one direction opposed by the weight of the valve, and means tending to positively move the inner end in such direction.

In testimony that I claim the foregoing as my own, I affix my signature in presence of two witnesses.

JAMES G. NOLEN.

In presence of—
   GEO. T. MAY, Jr.,
   MARY F. ALLEN.